(12) United States Patent
Fleischer et al.

(10) Patent No.: US 9,630,378 B2
(45) Date of Patent: Apr. 25, 2017

(54) DEVICE FOR AUTOMATED CONNECTION OF TWO COMPONENTS, A WOUND JOINT CONNECTION AND A METHOD OF CONNECTING TWO COMPONENTS IN A JOINT REGION

(71) Applicant: Karlsruher Institut für Technologie, Karlsruhe (DE)

(72) Inventors: Jürgen Fleischer, Karlsruhe (DE); Jochen Schädel, Karlsruhe (DE)

(73) Assignee: KARLSRUHER INSTITUT FÜR TECHNOLOGIE, Karlsruhe (DE)

( * ) Notice: Subject to any disclaimer, the term of this patent is extended or adjusted under 35 U.S.C. 154(b) by 494 days.

(21) Appl. No.: 14/039,742

(22) Filed: Sep. 27, 2013

(65) Prior Publication Data
US 2014/0093309 A1   Apr. 3, 2014

Related U.S. Application Data

(60) Provisional application No. 61/707,160, filed on Sep. 28, 2012.

(51) Int. Cl.
| | |
|---|---|
| B32B 37/12 | (2006.01) |
| B32B 7/12 | (2006.01) |
| B32B 37/16 | (2006.01) |
| B29C 70/84 | (2006.01) |
| B29C 65/48 | (2006.01) |
| B29C 65/50 | (2006.01) |
| B29C 65/00 | (2006.01) |

(52) U.S. Cl.
CPC ............... *B32B 7/12* (2013.01); *B29C 70/84* (2013.01); *B32B 37/16* (2013.01); *B29C 65/4835* (2013.01); *B29C 65/5042* (2013.01); *B29C 65/5092* (2013.01); *B29C 66/52241* (2013.01); *B29C 66/7212* (2013.01); *B29C 66/7394* (2013.01); *B29C 66/73941* (2013.01); *B29C 66/863* (2013.01); *Y10T 403/477* (2015.01)

(58) Field of Classification Search
CPC .......... B29C 65/5042; B29C 66/52241; B29C 66/863; B29C 70/22; B29C 70/24; B29C 70/38; B29C 70/84; B32B 7/12; B32B 7/14
USPC ........ 156/133, 166, 169, 178, 367, 441, 524
See application file for complete search history.

(56) References Cited

U.S. PATENT DOCUMENTS

| | | | | |
|---|---|---|---|---|
| 2002/0054968 A1* | 5/2002 | Hauber | .................... | B29C 53/68 428/34.4 |
| 2005/0037195 A1* | 2/2005 | Warek | ..................... | B29C 70/28 428/364 |
| 2010/0052203 A1* | 3/2010 | Inazawa | ............ | B29C 45/14631 264/103 |

* cited by examiner

*Primary Examiner* — George Koch
(74) *Attorney, Agent, or Firm* — Hamre, Schumann, Mueller & Larson, P.C.

(57) ABSTRACT

A device (1) for automated connection of two components (25, 27) in joint region (29) is proposed. The device (1) has a rotating winding device, especially a circle-segment-like rotor (3), which is arranged to guide a cloth tape (23) along winding paths (26) and to create a wound joint connection in the joint region (29).

18 Claims, 9 Drawing Sheets

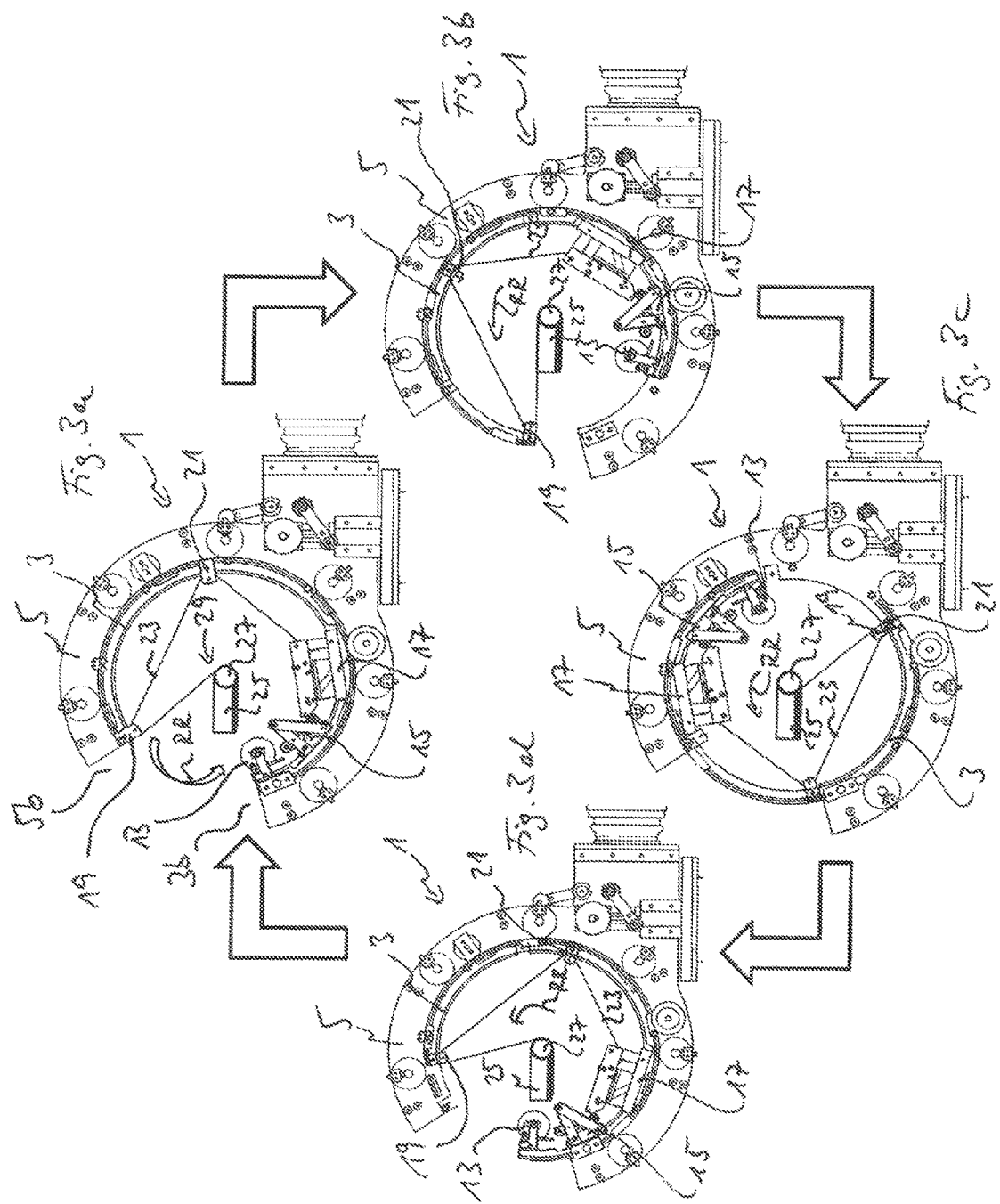

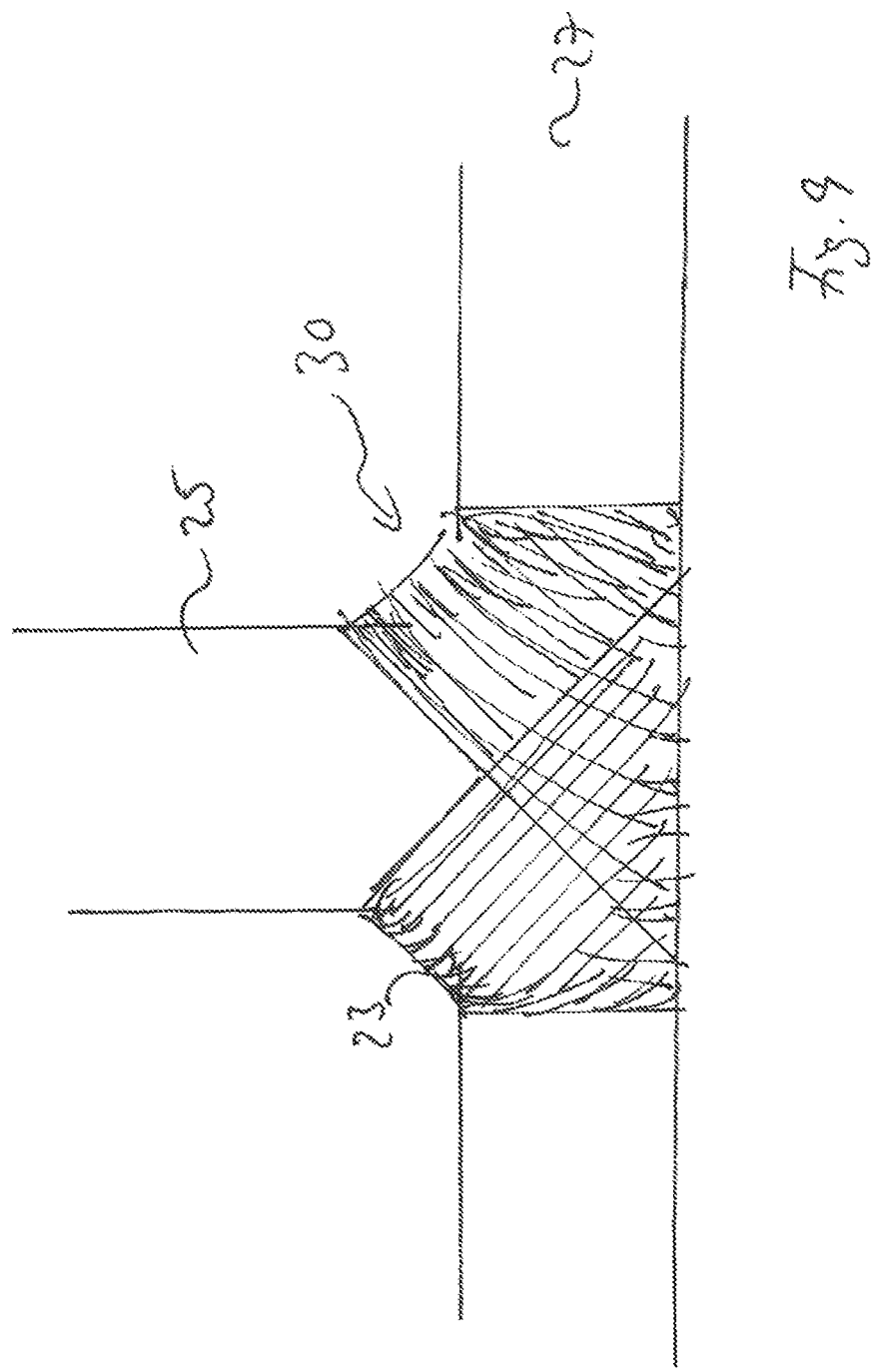

DEVICE FOR AUTOMATED CONNECTION OF TWO COMPONENTS, A WOUND JOINT CONNECTION AND A METHOD OF CONNECTING TWO COMPONENTS IN A JOINT REGION

The invention relates to a device for automated connection of two components, to a wound joint connection and to a method of connecting two components in a joint region.

Fiber-reinforced plastics (FRP), such as glass-fiber- or carbon-fiber-reinforced resin systems, have considerable advantages in respect of their weight-related strength and stiffness. They are therefore not only used in the fields of aircraft, automobile and bicycle construction but can equally be employed in ship building or in the construction of any other components, especially where lightweight frame structures are required. The connection point or joint between two or more FRP components routinely represents a weak point. For the production of lightweight load-bearing structures, for example frame structures, the FRP components often have a curved profile, particularly a tubular profile. In the case of bicycle frame construction, for example, tubes are adhesively butt-jointed to one another and manually over-laminated with a fiber layer in order to improve the visual appearance of the connection point. In order to increase the strength of such connections the tubes either need to be provided with an additional joint element or need to be produced using a monocoque technique, that is to say without joints, at simultaneously great expense in terms of tool costs. In the case of fiber composite materials based on thermosetting systems, such as resin, thermal joining methods are in principle excluded. The methods predominantly used for connecting two or more FRP components are therefore usually still technologies from the metals field. Examples thereof are classic rivet connectors, screws, inlays and also adhesive bonds. Adhesive bonding exhibits considerable variation in its strength values and is therefore unsuitable as a reliable method of connecting FRP components.

Hitherto, therefore, adhesive bonding of FRP components has been used only in combination with at least one further joining method, such as, for example, screws or rivets. Such joining methods, however, always destroy the fiber structure of the FRP components being connected. The problems associated with connecting two components occur not only when fiber-reinforced plastics are used, however; the connection of metal profiles, especially aluminum profiles, also gives rise to weak points. When a closed frame structure is closed by means of welding, far example, it is not possible to produce the welded seam in one pass, but rather it is necessary to interrupt the operation and "change grip" at least once, resulting in a weak point in the frame.

All in all, particularly in the case of FRP components, either joints create a structural weak point or joints having sufficient strength and stiffness can be achieved only at correspondingly great expense. In the case of the latter vanant, the connection can be made usually only by making a joint of suitably greater thickness, which goes against the concept of a lightweight construction.

The problem of the present invention is therefore to provide a device and a method for connecting two components and a resultant connection of those components that exhibits very high strength and stiffness combined at the same time with low weight.

To solve the above-mentioned problem there is proposed a device for automated connection of two or more components in the joint region thereof having the features described herein. The device has a rotating winding device, especially in the form of a circle-segment-like rotor which is arranged to guide a cloth tape along winding paths and to create a wound joint connection in the joint region of the two components.

An important aspect of the invention is therefore that the device according to the invention is arranged to carry out the winding of a cloth tape (for example wet filament winding), known per se for other purposes, advantageously as a joining method for connecting two or more components, especially FRP components. This is achieved by the rotating winding device's being able to rotate about the joint region of two components to be connected and in so doing being able to guide or wind a cloth tape along winding paths in such a way that a wound joint connection is formed in the joint region of the two components. Load tests on the joint provided with the wound joint connection have shown that fiber winding is excellently suitable as joining technology and joints of very high strength and low weight can be created entirely non-destructively. By means of the preferred circle-segment-like design of a rotor, it is also possible for two (FRP) components that are part of a closed frame structure to be connected to one another without generating mechanical weak points. This is especially advantageous for automobile manufacture where the use of lightweight load-bearing structures as frames (space frames) is increasingly gaining in importance. The device according to the invention is accordingly advantageously capable of carrying out a filament winding process as a joining method for the non-destructive connection of two components. Using appropriate open-loop and closed-loop control devices, the wound joint connection created by the device can be customized inter aka in terms of its thickness, resilience, position and surface distribution, so that an optimized joint connection can particularly also be achieved in the region where the joint is subject to increased stress. The device can in this way be used for virtually any kind of component, especially in terms of its dimensioning, position and load application. Overall, the wrapping of the two components allows an interlocking connection having very high strength and stiffness values to be obtained. Furthermore, such a connection, by virtue of its very simple stress profile, is easy to calculate and is adjustable within certain limits by varying the winding parameters. The winding parameters are especially the biasing force of the cloth tape, the degree of impregnation of the cloth tape and the laying path, that is to say the winding path of the cloth tape on the components in the joint region thereof. The mechanical properties of the joint connection can thereby be adjusted and matched flexibly to different components.

Preferably the circle-segment-like rotor is mounted in a circle-segment-like or C-shaped stator so as to be movable in a direction of rotation. The circle-segment shape of both the rotor and the stator enables the device according to the invention to create wound joint connections in closed frame structures. In order that the device can be introduced into a frame structure, the rotor and the stator must in a starting state be positioned relative to one another so that the openings of the circle segments are in alignment with one another. In this position a joint region of two or more components can be positioned in the working zone of the device. To remove the device from the joint region or to take the joint region out of the device, the rotor and the stator must again assume the aligned position of the circle segment openings. To create the wound joint connection in the joint region, the rotor is preferably configured and arranged so that it is able to rotate in the stator about a rotational axis. in order to ensure rotational movement of the rotor in the stator, the rotor is preferably arranged so that it is able to bridge an opening of the circle segment of the stator. The circle segment forming the rotor should consequently have a circular arc that is longer than the circular arc of the circle-segment opening of the stator.

The rotor can have, on its inner side facing the rotational axis, a preferably exchangeably mounted cloth tape supply spool onto which the cloth tape to be unwound has been wound. Starting from the supply spool, the cloth tape is preferably guided by way of a tensioning unit for tensioning the cloth tape, which tensioning unit is likewise arranged on the inner side of the rotor. In the event of a jolt-like tensile force being exerted on the cloth tape, the tensioning unit ensures, by cushioning or braking the force, that the cloth tape is prevented from tearing. The tensioning unit is preferably arranged in such a way that the resilience of the cloth tape and accordingly the stiffness of the wound joint connection can be adjusted. From the tensioning unit, the cloth tape is preferably guided through an impregnating unit for impregnating the cloth tape with a fluid, especially with a thermosetting fluid such as resin. Preferably, in the region of the impregnating unit the cloth tape is guided by suitable redirecting elements substantially in the direction of a rotational axis of the rotor, that is to say transverse with respect to the direction of rotation. As a result, the impregnating unit can be of substantially smaller construction. The overall dimensions, especially the radius, of the device according to the invention can thereby also be smaller. Furthermore, the smaller dimensioning of the impregnating unit reduces the risk of impregnating fluid escaping during rotational movement of the rotor. The impregnating unit enables the device according to the invention to carry out a wet filament winding process in which the resulting wound joint connection is formed from a fiber composite material, having a fiber material (cloth tape) and a plastics matrix (impregnating fluid). The rotor preferably also has a guide unit for guiding the cloth tape along the winding paths, which guide unit preferably has one or more filament guide roller(s) and/or ring filament eyelet(s) Starting from the guide unit, the cloth tape is positioned on the joint region of two components to be connected and unwound onto the two components along the winding paths.

The cloth tape supply spool, the tensioning unit, the impregnating unit (optional) and the guide unit are preferably arranged one after the other in the afore-mentioned order in a direction of rotation on the inner side of the rotor and, on rotational movement of the rotor, rotate about the rotational axis. If the rotational speed of the impregnating unit is sufficiently high, the resulting centrifugal forces force the impregnating fluid radially outwards in such a way that the fluid can be prevented from escaping during rotation, The stator does not undergo rotational movement, but it is nevertheless preferably mounted so as to be movable relative to two components that are to be arranged in the device, that is to say in the rotor. In particular, the stator is mounted so as to be movable in such a way that its angular position relative to the two components can be altered.

It is especially advantageous for the device to be constructed in such a way that it is able to implement winding paths that run substantially along geodetic lines on the two components located in the device, a geodetic line being understood as the shortest connection between two points on a curved surface. Winding paths that follow geodetic lines therefore come into consideration when the components to be connected have, at least in part, a curved surface. Departing from that line in the case of curved surfaces results in slippage of the cloth tape and loss of the established tension of the cloth tape, resulting in a reduction in the stiffness of the wound joint connection. Solely the friction that obtains between the impregnated cloth tape and the component surface allows a very slight departure from a geodetic line. Such friction, however, is substantially dependent upon the thermosetting system used and the nature of the joint partners, that is to say of the two components.

The stator preferably co-operates with a controller in such a way that its position and, in particular, its angular position relative to two components is determined in dependence upon predetermined, especially computer-generated, winding paths. The two components can be fixed in position by an external fastening device while the device according to the invention is creating the wound joint connection. The position of the stator can advantageously be altered during the winding process, so that different winding paths for forming the wound joint connection can be created during a single application process by the device. In addition, the winding paths can in that way be individually matched to any desired components. The rotor preferably likewise cooperates with a controller in such a way that its rotational speed can be subjected to open-loop and/or closed-loop control.

The cloth tape is preferably a so-called roving, that is to say a fiber bundle, especially a glass, aramid or carbon fiber bundle. The cloth tape is preferably elliptical or rectangular in cross-section and comprises a plurality of filaments (endless fibers) arranged in parallel. The length of the cloth tape wound on the cloth tape supply spool is preferably matched to the predetermined amount of cloth tape required for creating a particular wound joint connection, On the other hand, it is possible for the device to have an automatic cutting device for cutting off the cloth tape once the desired wound joint connection has been finished.

Furthermore, the device according to the invention can have at least one sensor that monitors the spacing between the stator and/or the rotor and the two components which, when the device is in normal use, are arranged in the working zone thereof. The sensors accordingly ensure that there are no collisions between parts of the device, especially rotating parts such as the rotor and the components to be wrapped.

The finished wound joint comprises the wound cloth tape impregnated with impregnating fluid which, for finishing, also requires a curing process. For that purpose, preferably a heat source is provided for curing the finished wound joint connection. The heat source can be integrated into the device, for example as an additional element of the rotor. In that way, the wound joint connection can undergo accelerated curing immediately after it has been finished. Alternatively, separate heat sources, for example a UV lamp, heatable half-shell tools or the like, can be used in order to obtain a wound joint connection having an optimum surface result.

The components for which the present device can be used may be a lightweight load-bearing structure comprising a reinforcing material composed of fibers and a plastics matrix, especially carbon, aramid or glass fibers. in conjunction with a thermosetting system, especially a resin system. Furthermore, at least one of the two components can have an at least partially curved profile and can especially be in the form of a round or tubular profile. In principle, however, the invention can also be used on metal profiles, especially aluminum profiles, which can be in the form of tubular profiles. The components to be wrapped accordingly form a winding core around which the impregnated cloth tape is wound.

The tension of the cloth tape is preferably adjustable by means of the tensioning unit. By appropriately varying the cloth tape tension, the properties of the joint, such as the stiffness, can be adjusted. It is thus possible, even after the individual parts of a total assembly have been produced, to impart specific rigidities to the connecting points of the individual parts. Not only is the device able to generate a different cloth tape tension for different applications, but, furthermore, the number of wrappings and accordingly the thickness of the wound joint connection as well as the angle of the winding paths relative to the joint can be matched flexibly to the load scenario in question.

To achieve an optimum, individually customized wound joint, the device according to the invention preferably co-operates with a suitable computer program. Such a computer program can carry out a method in which a wound joint connection is individually designed and configured before implementation by the device according to the invention, this being effected with respect to a specific joint to be reinforced between two components. The design and configuration is preferably effected by means of so-called finite element simulation, with which a 3D model of the individual joint region can be generated with the aid of a computer. On that basis, it is then possible to simulate the load paths arising in the joint or in the joint region in the case of different load scenarios acting on the joint. On the basis of the load paths of highest tension that are identified, it is then possible to calculate accordingly the winding paths on the components along which the cloth tape needs to be laid in order to obtain optimum reinforcement of the regions of the connection point that are subject to the greatest stress. In that way optimum use can be made of the properties of the cloth tape. The computer-generated winding paths can then be transferred to the controller of the device according to the invention, on the basis of which the winding of the cloth tape around the connection point in question is carried out.

To solve the above-mentioned problem, furthermore, a wound joint connection having the features described herein is proposed. The wound joint connection serves for the non-destructive connection of two components in a joint region. It has a cloth tape which runs, preferably in a plurality of layers, along winding paths around the two components, the winding paths being arranged substantially on geodetic lines. By virtue of the arrangement of the winding paths on geodetic lines—the shortest connection between two points on a curved surface—the wound joint connection has optimum stiffness on a curved surface. Departing from that line results in slippage of the cloth tape and loss of its previously established tension, thus resulting in a reduction in stiffness. The joint connection preferably runs by way of tension zones of the joint region of the two components that are subjected to increased tension when a load acts on a joint between the two components. The determination of these zones of increased tension can be effected, for example, by simulation of different load scenarios, especially with the aid of a finite element method.

The two components are preferably interlockingly connected to one another in such a way that one of the two components has a joint in an end region or centre region of a profile for connection to the respective other of the two components. The joint can have been produced by various methods, for example by shaping or by some other material-processing method. What is important is that the joint enables an interlocking connection to be made in the joint region of the two components. This can be effected, for example, by widening or milling out an end region of a component in such a way that the widened or milled portion is matched to the profile of the respective other component. In the overlap region, that is to say in the region of contact between the two components, the winding paths should then be arranged along geodetic lines. In addition to the wound joint connection, it is possible initially to provide an adhesive bond at the joint for the temporary positioning of the two components relative to one another, which facilitates handling of the components.

Preferably, at least one of the two components is in the form of a lightweight load-bearing structure and consequently comprises a reinforcing fiber material and a plastics matrix, especially carbon, aramid or class fibers and a thermosetting system, especially a resin system. At least one of the two components can have an at least partially curved profile, especially a tubular profile. Furthermore, the cloth tape is advantageously a fiber bundle, that is to say a so-called roving, which may be a glass, aramid or carbon fiber bundle. The two components can be part of a closed frame. Furthermore, the cloth tape can be impregnated with a thermosetting system, especially with resin, so that the wound joint connection ultimately can be formed from a fiber composite plastics.

To solve the above-mentioned problem there is also proposed a method of connecting two components in a joint region by making a wound joint connection. The method is distinguished by automated winding of a cloth tape around the components along winding paths in the joint region, it being possible for the winding paths to run substantially on geodetic lines.

By virtue of the automated guidance of the cloth tape around the components along winding paths which preferably run on geodetic lines on a curved surface of the components, the production of a particularly secure, optimum wound joint connection is achieved. Furthermore, the joint connection can be individually matched to different applications.

The method can, furthermore, include the further step of making a joint on at least one of the two components for connecting the two components in the joint region, the joint being made prior to winding the cloth tape around the components. The joint can be arranged at an end of the profile or in the centre of the profile of the component in question and can preferably be such that it forms an interlocking connection with a region of the respective other component. The joint accordingly creates an interlocking connection between the two components such that the components are in contact with one another in overlap regions which are to be wrapped. Prior to the winding, a temporary connection between the two components can be made in the region of the joint, which connection can especially be achieved by adhesive bonding in the region of the joint. In order to increase the strength of the resulting wound joint connection, prior to winding the cloth tape can be impregnated with a fluid, especially with a thermosetting system, for example of resin. After the winding of the cloth tape in the joint region of the two components, the cloth tape can be cured, especially by the action of heat on the cloth tape.

For automating the method according to the invention it is possible to provide, for example, a device according to the invention that co-operates with a controller containing the winding paths to be followed. The individual optimum winding paths, which may differ according to the type of component and the application, are simulated, for example, by a computer assisted system, especially by determining, at different loads acting on the joint between the two components, tension zones of the joint region that are subjected to increased tension under the action of a load in dependence upon the tension zones determined, the winding paths can then be transferred to the controller and the cloth tape wound around the two components in accordance with those winding paths.

The invention will be explained in greater detail below with reference to the drawing, wherein:

FIG. 3a is a diagrammatic side view of the device according to the invention in a first winding position;

FIG. 3b is a diagrammatic side view of the device according to the invention in a second winding position;

FIG. 3c is a diagrammatic side view of the device according to the invention in a third winding position;

FIG. 3d is a diagrammatic side view of the device according to the invention in a fourth winding position;

FIG. 9 shows a finished wound joint connection between two components.

Figure 1:
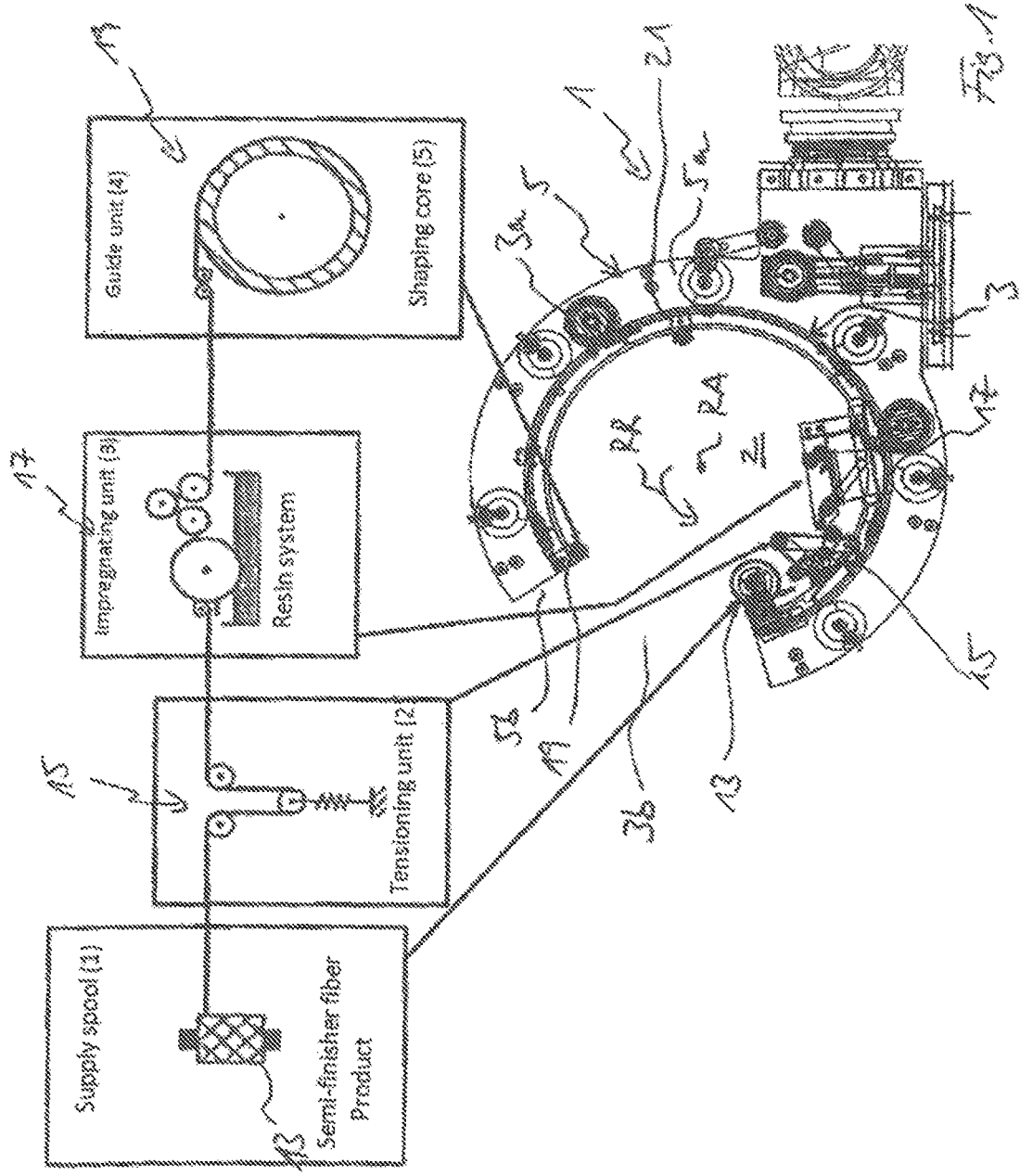
FIG. 1 is a diagrammatic side view of a device for automated connection of two components according to the invention.

FIG. 1 shows a diagrammatic side view of a device 1 for automated connection of two components (not shown in FIG. 1) located in the working zone 2 of the device 1. The device 1 comprises a rotating winding device which in the embodiment shown in FIG. 1 is in the form of a circle-segment-like rotor 3. The rotor 3 is therefore substantially C-shaped and consequently comprises a circle segment 3a and a radial opening 3b, each of which describes a circular arc. The rotor 3 is mounted so as to be rotatable about a rotational axis RA inside a stator 5. When the device 1 is in operation, a joint region of two components to be connected is located approximately in the region of the rotational axis RA.

In the embodiment in accordance with FIG. 1, the stator 5, like the rotor, is circle-segment-like and consequently is likewise C-shaped with a circle segment 5a and a radial opening 5c, each of which describes a circular arc. The rotor 3 is therefore arranged concentrically with respect to the stator 5 and fulfils the function of a carriage mounted inside the stator 5 so as to be rotatable in a direction of rotation RR. For that purpose, the stator 5 has a suitable bearing on its inner side, that is to say on its side facing the rotational as RA. Suitable drive means are provided for generating a rotational movement of the rotor 3 relative to the stator 5. The drive means can be, for example, electric or magnetic especially similar to a linear motor, or mechanical by means of gearwheels, rollers, chains or similar drive mechanisms.

Figure 2:
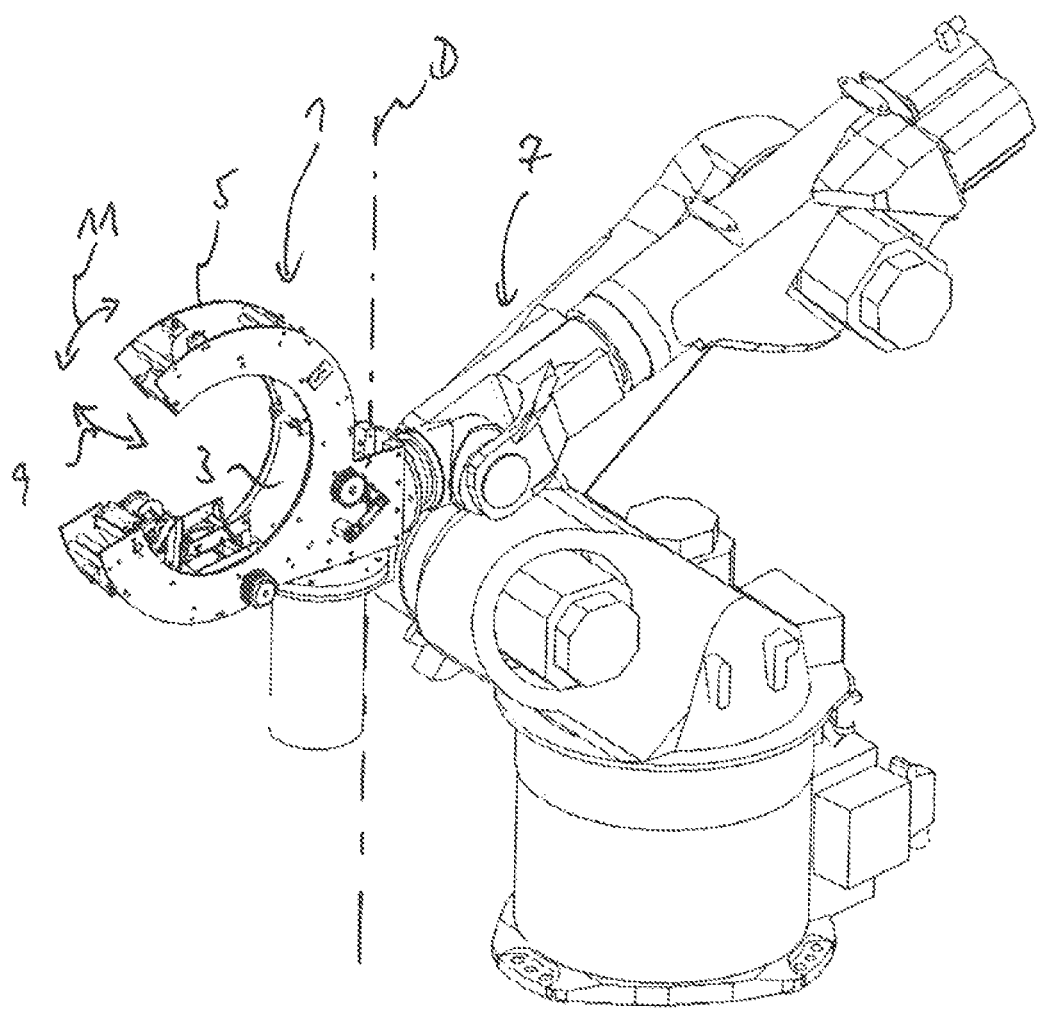
FIG. 2 is a perspective view of a device for automated connection of two components according to the invention.

As can be seen especially well in FIG. 2, the stator 5 can be mounted on a robot 7. The robot can have a controller (not shown in the Figures) which not only enables the rotational speed of the rotor 3 to be subjected to open-loop and/or closed loop control, but, furthermore, is able to effect displacement of the stator 5 in all spatial directions and can therefore be integrated in an optimum way into any desired production process. The robot 7 can, by means of the controller, also alter the angular position of the stator 5 relative to components that are arranged in the working zone 2 of the device 1. Movement of the stator 5 is accordingly possible in the direction of arrow 9, for example as a result of its being able to turn about a rotational axis D or as a result of a pivoting movement of the robot arm. It is also possible for the stator 5 to be mounted so as to be movable, at least within certain limits, in the direction of arrow 11, that is to say in the direction of rotation RR By means of the controller, the rotor 3 can also be caused to rotate about the rotational axis RA and the speed of the rotor 3 can be subjected to open-loop or closed-loop control.

For the automated connection of two components in a joint region, the device 1 has a cloth tape supply spool 13, which can be seen in FIG. 1, on which a cloth tape (not shown in FIG. 1), especially a so-called roving, which may be, for example, a glass, aramid or carbon fiber bundle, has been wound. Furthermore, a tensioning unit 15 is provided which serves for tensioning and braking the cloth tape wound on the cloth tape supply spool. By means of the tensioning unit, the fiber tension of a wound joint connection can be adjusted and jolt-like tensile forces exerted on the cloth tape can be cushioned, so that tearing of the cloth tape is avoided. The rotor 3 comprises, in addition, an impregnating unit 17 for impregnating the cloth tape with a fluid. The impregnating fluid can be, for example, a resin system. Finally, a guide unit 19 can also be provided which is arranged to guide the cloth tape along winding paths on the components and which, seen in the circumferential direction of the rotor 3, is arranged at one end of the circle segment 3a close to the opening 3b. The guide unit 19 can have one or more guide rollers and/or ring filament eyelets. FIG. 1 shows an additional guide roller 21 which serves for transferring the cloth tape from the impregnating unit 17 to the guide unit 19.

The device 1 can have additional devices, especially safety devices such as sensors or a heat source for finishing the wound joint connection, but they are not shown in FIG. 1.

The cloth tape supply spool 13, the tensioning unit 15, the impregnating unit 17 and the guide roller 19 are arranged on the inner side of the rotor 3, that is to say on the side facing the rotational axis RA, in the afore-mentioned order one after the other in the direction of rotation RR. It should be noted here that the impregnating unit 17 is not necessarily present, but rather it is also possible to arrange the device 1 for carrying out a dry winding process in which the cloth tape is wound onto the winding core, that is to say in this case onto the joint region of two components, without prior impregnation and is only then provided, especially sprayed, with a thermosetting material, especially with a resin, and thus impregnated. The cloth tape supply spool can be a reel having internal take-off or external take-off. By immersion of the cloth tape in the impregnating unit 17, the cloth tape is coated with resin. The cloth tape can then be guided through an impregnating fluid wiping device in order to free the cloth tape of excess fluid.

The mode of operation of the device and a corresponding method will now be described in greater detail with reference to FIGS. 3a to 3d. FIG. 3a shows a diagrammatic side view of the device 1 with the rotor 3 in a first winding position. Identical parts have been given the same reference symbols and so in that regard reference is made to the description relating to the preceding Figures.

When the rotor 3 is in the position shown in FIG. 3a. in which the opening 3b of the rotor 3 is in alignment with the opening 5b of the stator 5, components 25 and 27 can be positioned in the working zone 2 of the device 1 and are thus surrounded by the rotor 3, that is to say when the two openings 5b and 3b overlap the device 1 can be introduced into a closed frame structure or removed therefrom again. Prior to the positioning of the device 1, the two components must already be held in the correct connection position relative to one another in a suitable way, for example by being adhesively bonded or coupled to one another.

As can be seen in FIG. 3a, starting from the cloth tape supply spool 13 a cloth tape 23 is guided through the tensioning unit 15, the impregnating unit 17. the guide roller 21 and the guide unit 19. The cloth tape 23 extends from the guide unit 19 to the two components 25 and 27 arranged in the working zone 2 of the device 1. For easier handling, the components have preferably already been adhesively bonded or coupled at the joint. The cloth tape 23 is applied to the components in the joint region 29. Since the cloth tape 23 has been impregnated with the impregnating fluid, it adheres to the components.

Starting from the position shown in FIG. 3a, the cloth tape 23 is then wound around the components 25 and 27 in the joint region 29. For that purpose the rotor 3 rotates in direction of rotation RR about the rotational axis RA and accordingly around the components 25 and 27. As a result, the elements mounted on the inner side of the rotor rotate about the rotational axis RA. The rotation causes the cloth tape 23 to be unwound from the cloth tape supply spool 13 and drawn through the impregnating bath 17. In FIGS. 3c and 3d, the rotor 3 is turned further in the direction of rotation RR so that after one complete revolution of the rotor 3 the cloth tape 23 has been wound once around the components 25 and 27 along a preset winding path.

The procedure illustrated in FIGS. 3a to 3d is repeated until the desired number of windings has been wound around the components 25 and 27 or until the cloth tape wound on the cloth tape supply spool 13 has been used up. To implement different winding paths, the stator is displaced relative to the components during the winding process.

The number of windings, the winding paths and the dimensions of the winding region can vary in dependence upon the joint region to be wound and the stiffness and strength to be achieved. The winding paths and the dimensioning (the angular region) of the wound joint are primarily determined by how the cloth tape 23 is guided in the rotor 3 and by the positioning of the stator 5 relative to the components 25 and 27. The components 25 and 27 are preferably held by an external device which can be part of a production process of a frame structure or the like. The device 1 can in that case be introduced into the ongoing production process, especially with the aid of the robot 7.

Figure 5:
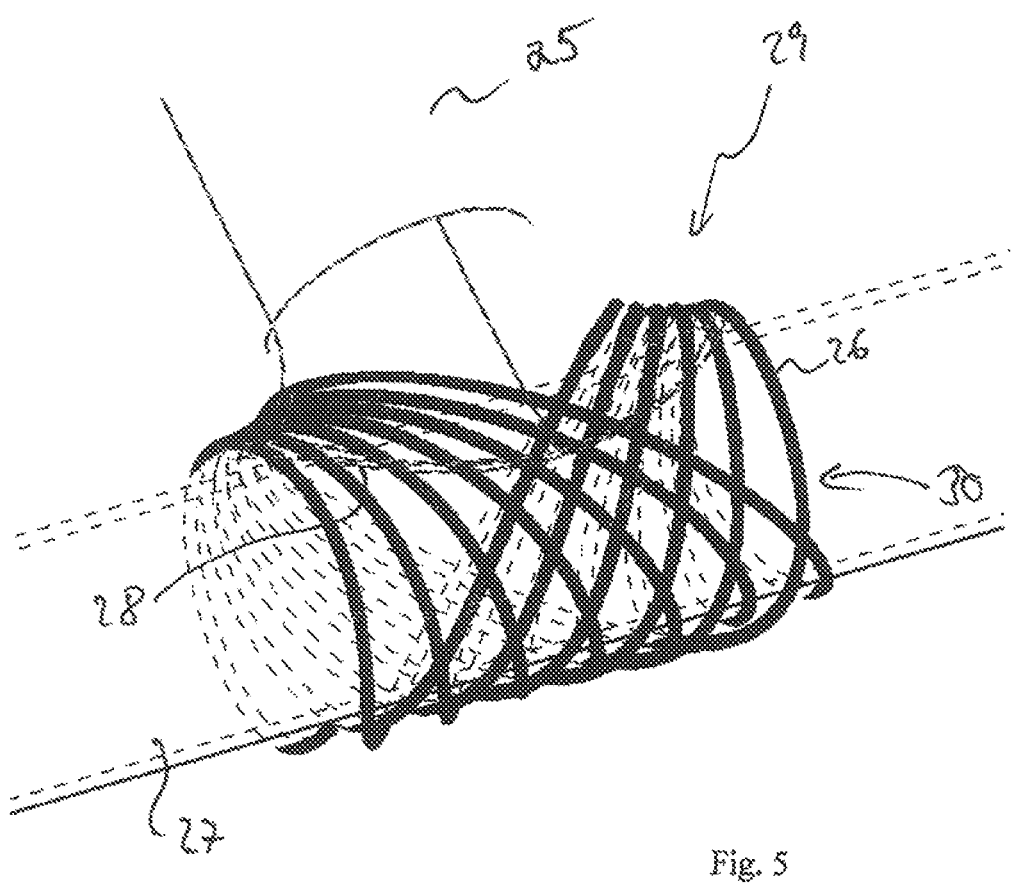
FIG. 5 is a CAD representation of a winding path in a joint region of two components.

Purely by way of example, the invention is explained herein by reference to two components 25 and 27 to be connected. which, as shown in FIG. 5, are joined together to form a T-shape and are in the form of round profiles, especially tubular profiles. In principle, the invention can also be applied to joint regions between more than two components. FIG. 5 clearly shows that the component 25 is arranged perpendicular to the other component 27 and has, at its end facing the component 27, a joint 28 which is matched to the shape of the central region of the component 27 so as to interlock with the component 27. For that purpose the end of a conventional component 25 can have been correspondingly shaped or can be specially produced, for example in an injection-molding process, so as to be individually matched to the connection in question. For example, the end of the component 25 can have been milled out at one end in such a way that it can be pushed onto the other component 27. What is important is that the joint, that is to say the region of contact between the components 25 and 27, provides a suitable overlap region that allows wrapping of the two components 25 and 27 along winding paths 26 in order to create a wound joint connection 30, shown diagrammatically in FIG. 5, in a joint region 29. In the present case, a joint region 29 is understood to be the region of the joint 28 and a region extending beyond the joint in which the winding paths 26 can run. The joint region is accordingly a region in the close vicinity of the connection point of the two components 25 and 26.

A finished wound joint connection 30 is shown in FIG. 9. It can clearly be seen therein that in the joint region 29 the cloth tape 23 runs in a plurality of layers along the winding paths 26 shown in FIG. 5.

It can also be seen in FIG. 5 that the winding paths 26 run symmetrically with respect to the joint 28 or with respect to the joint region 29 but, depending upon the application and the nature of the component, the winding paths and accordingly the wound joint connection 30 can also be arranged unsymmetrically. Furthermore, it will be seen that the winding paths 26 overlap at the joint 28. Such overlaps make it possible to create a particularly rigid connection in the region of the joint 28. in the device 1, during a winding process initially a first region to the right or left of the component 25 shown in FIG. 5 is wound. The stator 5 is then pivoted relative to the components in such a way that the region on the respective other side can be wound.

Overall the device 1 according to the invention creates a wound joint connection 30 in the joint region 29 of two components 25 and 27 as follows: the cloth tape 23 is taken off the cloth tape supply spool 13 by the rotation, brought to tension by the tensioning unit 15 in conjunction with a brake, impregnated with resin in the impregnating bath 17 and finally wound around the components 25 and 27 to be connected. In order to determine the winding region, that is to say the dimensioning of the wound joint connection 30, preferably the optimum cloth tape position on the components is determined prior to the winding operation. That optimum cloth tape position is subject to limitations imposed by the shape of the component, the intended design and the kinematics of the winding movement, it being necessary for collisions between the rotor/stator and the components to be prevented. The winding paths 26 of the cloth tape 23 are therefore preferably determined individually for each joint region 29 and the device 1 controlled accordingly on the basis of the calculated winding paths.

Figure 4A:
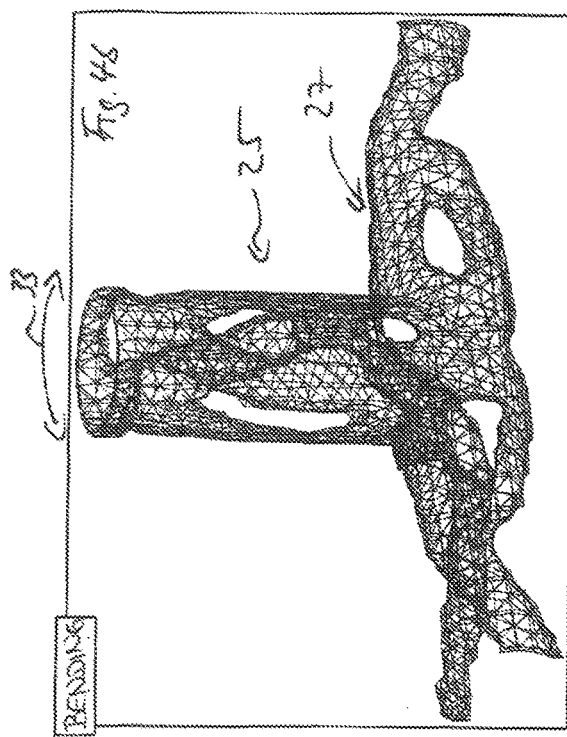
FIG. 4a is a diagrammatic view of the load paths when a tensile force is exerted on the connection between two components.
Figure 4B:
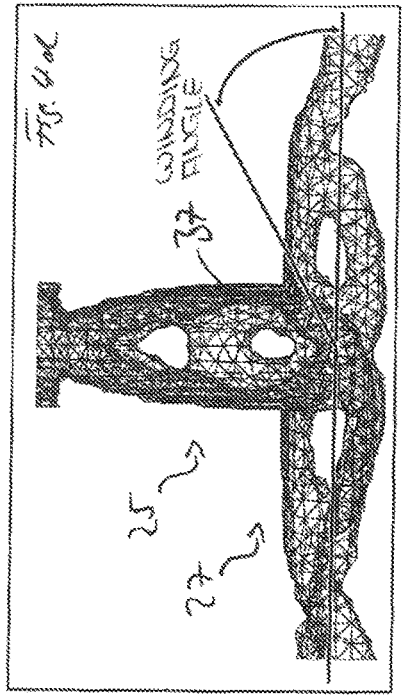
FIG. 4b is a diagrammatic view of the load paths when a bending force is exerted on the connection between two components.
Figure 4D:
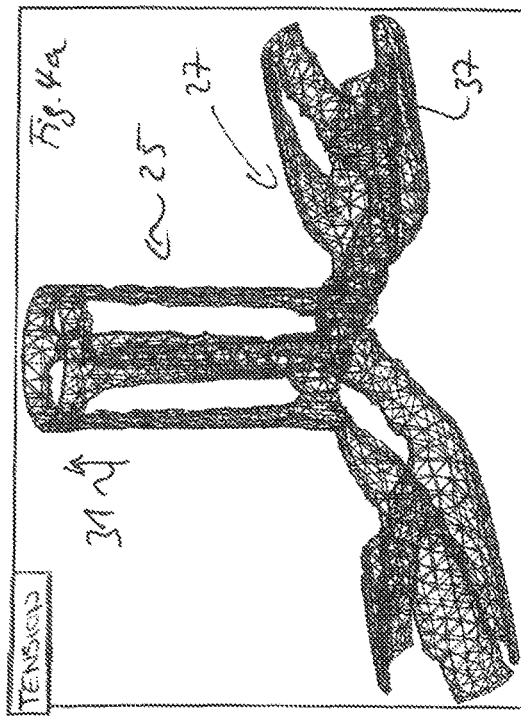
FIG. 4d is a diagrammatic view showing the determination of the optimum winding angle.
Figure 4C:
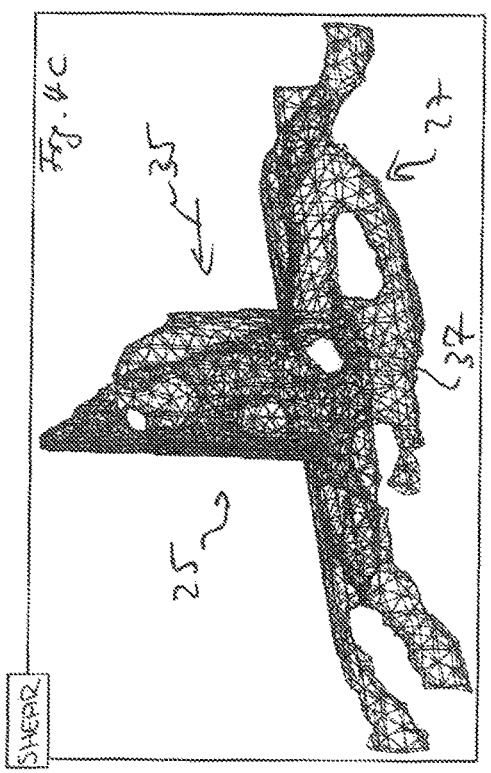
FIG. 4c is a diagrammatic view of the load paths when a shearing force is exerted on the connection between two components.

In order to match each joint region 29 of two or more components in an optimum way to their particular load scenario, the load paths in the individual joint region are identified, the load region in question being represented by finite element simulation and the load paths in the components being determined for different load scenarios. FIGS. 4a, 4b and 4c each show simulated load paths of the same joint region of the two components 25 and 27 connected to form a T-shape for different load scenarios. For example, FIG. 4a shows the joint region subjected to tensile stress in the direction of arrow 31. With the aid of the simulation it is then possible to determine regions of maximum tension, as shown in FIGS. 4a to 4c. Regions in which relatively low tension is observed in the load scenario in question are removed from the representation, leaving the zones of maximum tension, referred to hereinbelow as tension zones 37, namely the surfaces provided with triangles.

FIG. 4b shows the resultant load paths in a load scenario in which the component 25 is bent along arrow 33, whereas in FIG. 4c a shearing force is exerted on the component 25 in the direction of arrow 35. As shown by way of example in FIG. 4d with reference to the load scenario according to FIG. 4b (bending), the winding angle a can be determined on the basis of the tension zones 37, it is thus possible to determine the region which must be covered by the cloth tape 23 in the joint region 29 in order for the wound joint connection 30 to create an optimum join between the component 25 and the component 27.

The winding paths 26 of the cloth tape 23 are then determined in dependence upon the identified load paths by means of a computer-assisted optimization process. The winding paths 26 are determined in the region of the load paths so that they run approximately along geodetic lines—the shortest connection between two points on a curved surface—on the curved surface of the components 23 and 25. The winding paths 26 can be reproduced, for example, by means of a CAD-generated 3D representation according to FIG. 5, The resultant winding paths 26 are transferred to a robot controller which then controls the winding parameters, especially the position of the stator 5 and the rotational speed of the rotor 3 and also the tension of the cloth tape 23 in such a way that a wound joint connection optimized for a corresponding component is formed in the joint region of two components. In order that the predetermined winding paths 26, which, as explained, may differ according to the application, can be implemented by the device 1, it is necessary, as explained at the beginning, for the stator 5 to move relative to the joint region 29.

Figure 6:
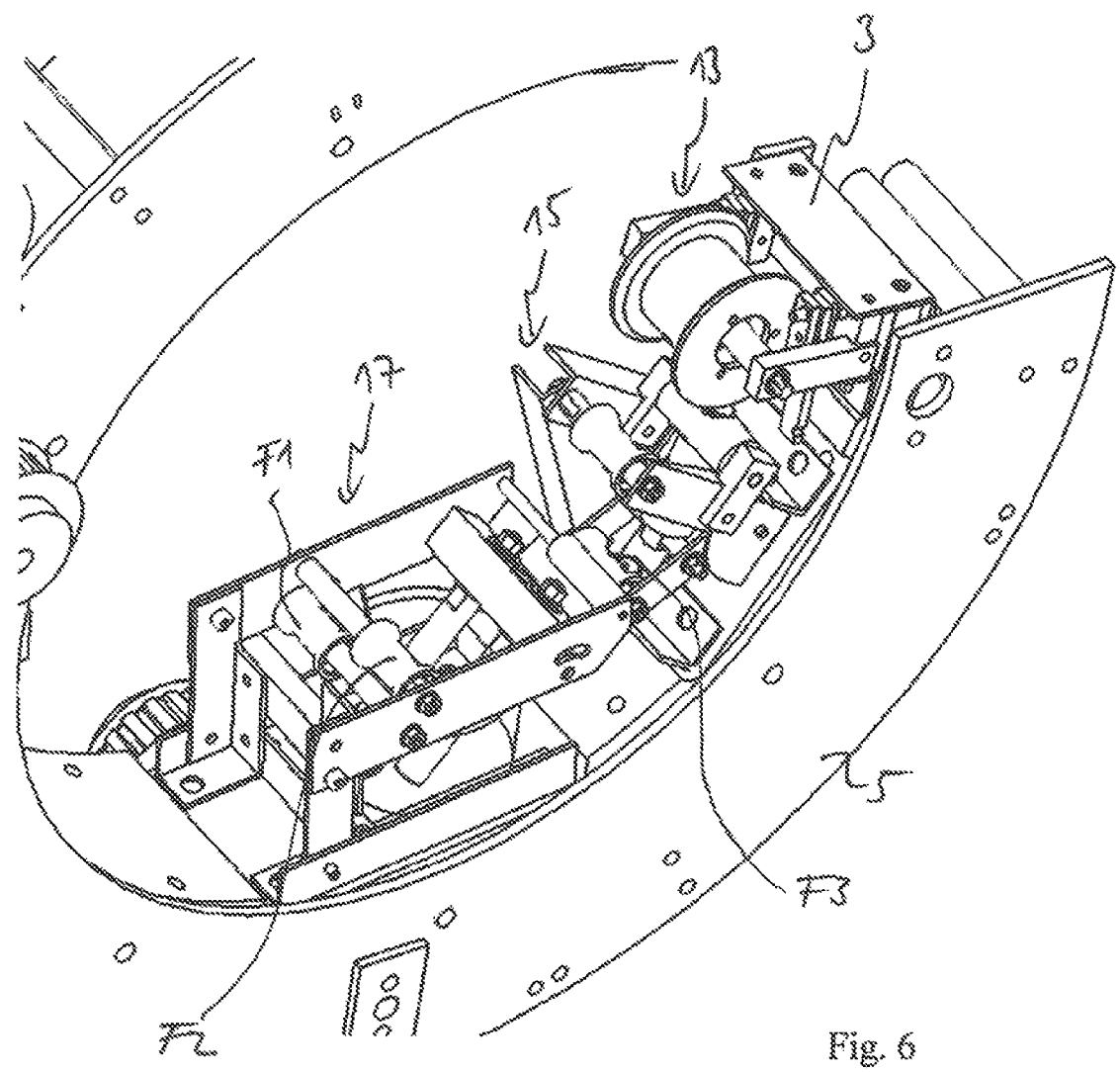
FIG. 6 is a perspective detailed view of the cloth tape supply spool, the tensioning unit and the impregnating unit of the device according to the invention.

FIG. 6 shows a further detailed perspective view of the rotor 3 mounted in the stator 5. FIG. 6 clearly shows the cloth tape supply spool 13, the tensioning unit 15 and the impregnating unit 17 arranged one after the other in the direction of rotation RR.

Figure 7:
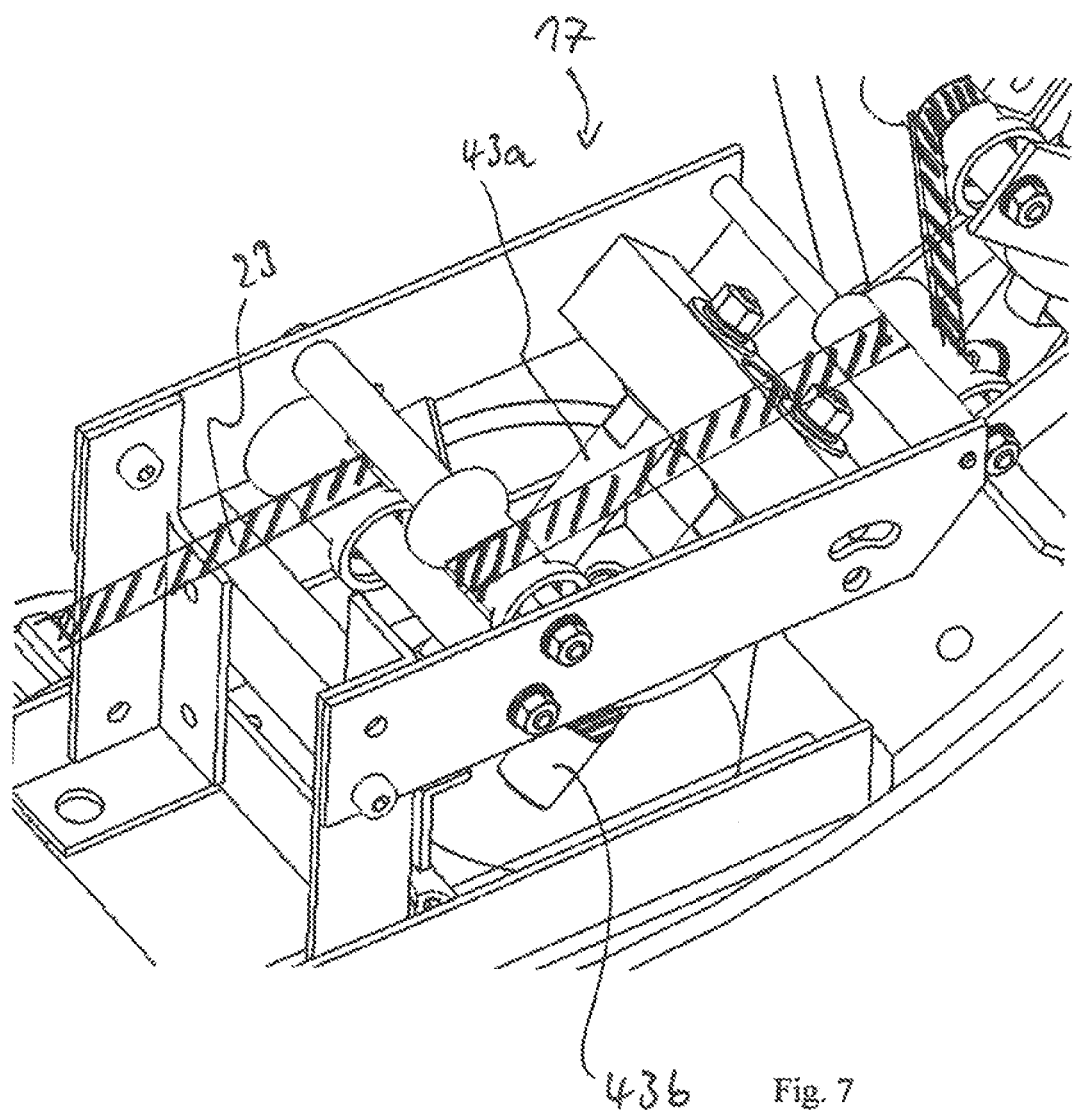
FIG. 7 is a detailed view of the impregnating unit in accordance with FIG. 6 on a larger scale.
Figure 8:
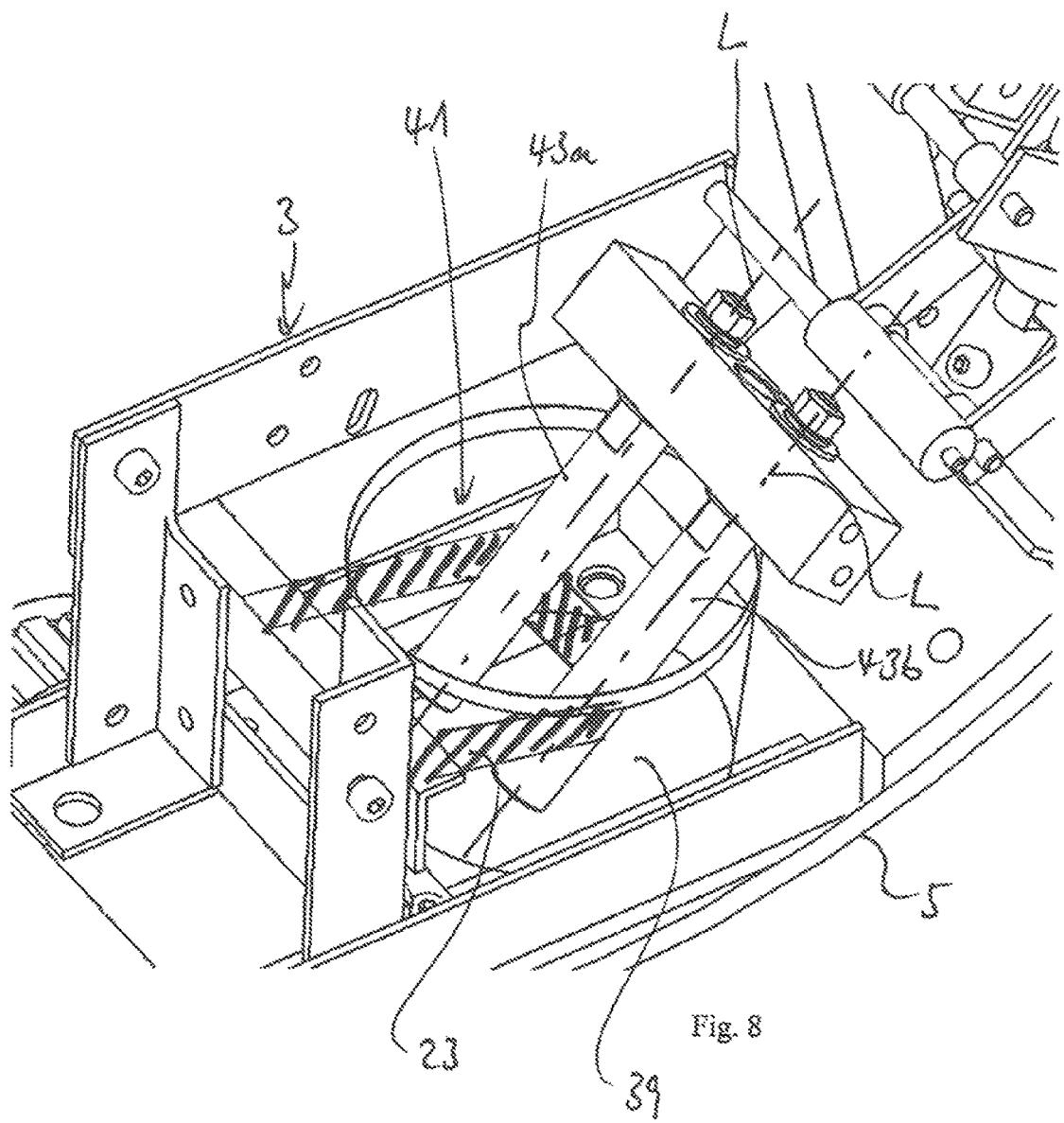
FIG. 8 is a detailed view of the impregnating unit according to the invention on a yet larger scale.

The impregnating unit 17 is shown on an enlarged scale in FIG. 7 and FIG. 8 and it can be seen that the impregnating unit 17 has a container 39 for holding impregnating fluid 41 which is especially formed from resin. In the region of the impregnating unit 17, the cloth tape 23 is guided substantially in the direction of the rotational axis RA of the rotor 3.

As can be seen especially clearly in FIGS. 7 and 8, in the present exemplary embodiment this is brought about by guiding the cloth tape 23 in such a way that the cloth tape 23 is guided between the base of the container 39 and two preferably cylindrical, especially identically constructed, redirecting elements. The redirecting elements are preferably arranged in parallel and in the present case, purely by way of example, are in the form of cylindrical bolts 43a and 43b. The redirecting elements guide the cloth tape 23 in the impregnating unit 17 in the direction of rotational axis RA. For that purpose, the cloth tape 23, coming from the tensioning unit 15, is initially guided from a first guide roller F1 to a first redirecting element 43a and, by means of that element, turned through 90° from direction of rotation RR into the direction of rotational axis RA. From the first redirecting element 43a, the cloth tape 23 is guided through the impregnating bath to the second redirecting element 43b, where it is again turned through 90° and passed to a second guide roller F2. The second guide roller F2 is arranged on the same side of the impregnating unit 17 as the first guide roller F1 relative to the direction of rotation RR. From the second guide roller F2 the cloth tape 23 is guided towards the opposite side of the impregnating unit 17 to a third guide roller F3. In the embodiment shown in FIGS. 7 and 8, the redirecting elements 43a and 43b project, at least in part, into the container 39 and into the impregnating fluid 41 located therein.

The longitudinal axis L of the guide elements 43a, 43b can be aligned substantially perpendicularly to the direction of rotational axis RA and can, furthermore, be arranged substantially tangentially with respect to the direction of rotation RR or to the circular path described by the rotor 3. In that way the impregnating unit 17 is of particularly compact construction.

All in all, it can accordingly be seen that the present invention is able to create, advantageously non-destructively, a wound joint connection having very high strength and stiffness. The invention can also be used on closed frame structures, such as, for example, an automobile frame. Furthermore, the winding parameters can be adjusted so that an individually customized and consequently optimally wound joint connection can be produced. This is advantageous especially in the case of FRP components, because it avoids any destruction of the fibers and accordingly weak points in the joint region. Furthermore, by varying the winding parameters, especially the position of the winding paths and the tension of the cloth tape, it is possible for the wound joint connection to be matched to different joint regions of different components in respect of stiffness and strength.

LIST OF REFERENCE SYMBOLS 1 device
2 working zone
3 rotor
3a circle segment
3b opening
5 stator
5a circle segment
5b opening
7 robot
9 arrow
11 arrow
13 cloth tape supply spool
15 tensioning unit
17 impregnating unit
19 guide unit
21 guide roller
23 cloth tape
25 component
26 winding path
27 component
28 joint
29 joint region
30 wound joint connection
31 arrow
33 arrow
35 arrow
37 tension zone
39 container
41 impregnating fluid
43a first guide element
43b second guide element RA rotational axis
RR direction of rotation
D pivot axis
α winding angle
L longitudinal axis
F1 first guide roller
F2 second guide roller
F3 third guide roller

The invention claimed is:

1. Device for automated connection of two components in a joint region, the device comprising:
   a rotating winding device, including a circle-segment-shaped rotor and a guide unit having one or more filament guide roller(s) and/or ring filament eyelet(s), which is arranged to guide a cloth tape along winding paths and to create a wound joint connection in the joint region,
   wherein the circle-segment-shaped rotor is mounted in the circle-segment-shaped stator so as to be movable in a direction of rotation (RR) and the circle-segment-shaped rotor is able to bridge an opening of the circle segment of the circle-segment-shaped stator, and
   wherein the circle-segment-shaped stator co-operates with a controller in such a way that its angular position relative to the two components is determined in dependence upon predetermined, computer-generated, winding paths.

2. Device according to claim 1, wherein the circle-segment-shaped rotor has a cloth tape supply spool.

3. Device according to claim 1, wherein the circle-segment-shaped rotor has a tensioning unit for tensioning the cloth tape.

4. Device according to claim 1, wherein the circle-segment-shaped rotor has an impregnating unit for impregnating the cloth tape with a fluid.

5. Device according to claim 2, wherein the cloth tape supply spool, a tensioning unit for tensioning the cloth tape, an impregnating unit for impregnating the cloth tape with a fluid, and the guide unit are arranged one after the other in the afore-mentioned order in a direction of rotation (RR) on the inner side of the circle-segment-shaped rotor.

6. Device according to claim 1, wherein in a region of an impregnating unit for impregnating the cloth tape with a fluid, the cloth tape runs substantially in the direction of a rotational axis (RA) of the circle-segment-shaped rotor.

7. Device according to claim 1, wherein the circle-segment-shaped stator is mounted so as to be movable relative to the two components, in such a way that its angular position relative to the two components can be varied.

8. Device according to claim 1, wherein the winding paths run substantially along geodetic lines.

9. Device according to claim 1, wherein the position of the circle-segment-shaped stator can be altered during the winding process.

10. Device according to claim 1, wherein the two components are part of a closed frame.

11. Device according to claim 1, wherein the cloth tape is a fiber bundle, that is at least one of a glass, aramid or carbon fiber bundle.

12. Device according to claim 1, wherein at least one sensor is provided which monitors the spacing between the circle-segment-shaped stator and/or the circle-segment-shaped rotor and the two components.

13. Device according to claim 1, wherein a heat source for curing the finished wound joint connection is provided.

14. Device according to claim 1, wherein at least one of the two components is in the form of a lightweight load-bearing structure, comprising a reinforcing fiber material including at least one of carbon, aramid or glass fibers and a thermosetting system, and a plastics matrix including a thermosetting system, that is a resin system.

15. Device according to claim 1, wherein at least one of the two components has an at least partially curved profile in the form of a tubular profile.

16. Device according to claim 1, wherein the circle-segment-shaped rotor co-operates with a controller in such a way that its rotational speed is controllable.

17. Device according to claim 4, wherein the circle-segment-shaped rotor has an impregnating unit for impregnating the cloth tape with a fluid that is a thermosetting system.

18. Device according to claim 4, wherein the circle-segment-shaped rotor has an impregnating unit for impregnating the cloth tape with a fluid that is a resin system.

* * * * *